E. P. SPERRY.
FEEDING MECHANISM FOR FERTILIZER SPREADERS.
APPLICATION FILED AUG. 24, 1907.
934,471.
Patented Sept. 21, 1909.
2 SHEETS—SHEET 1.
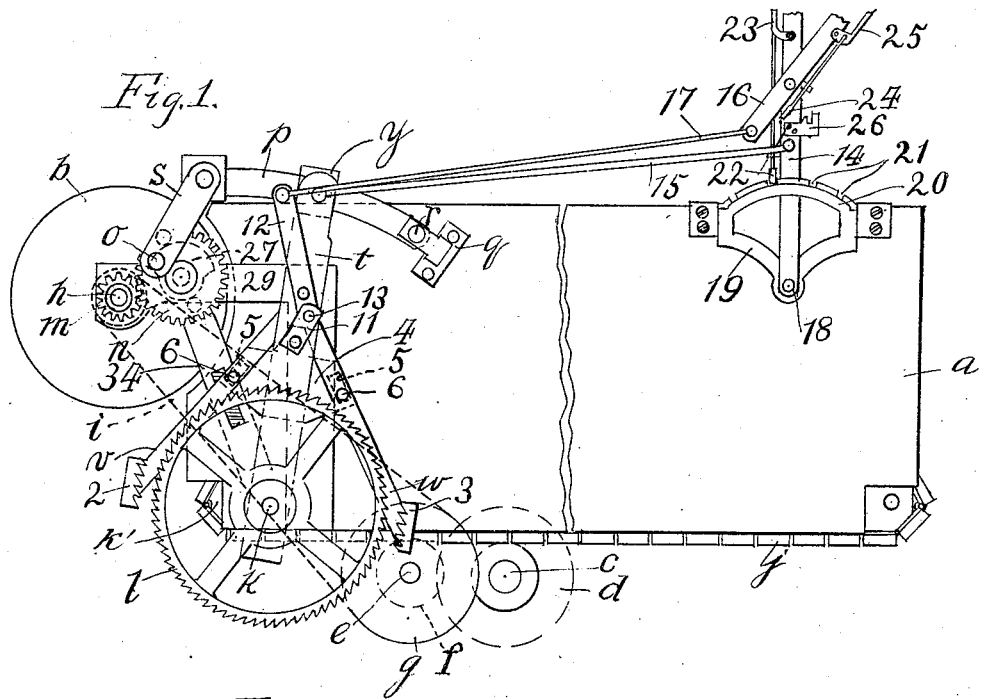
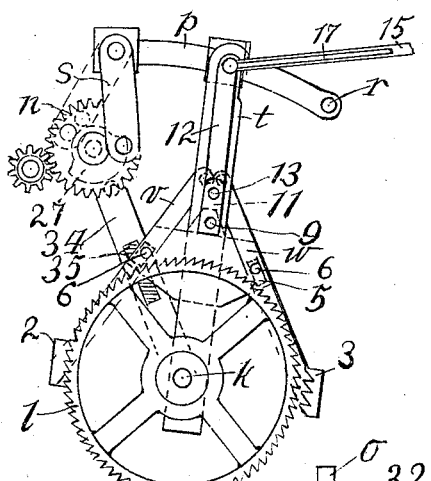
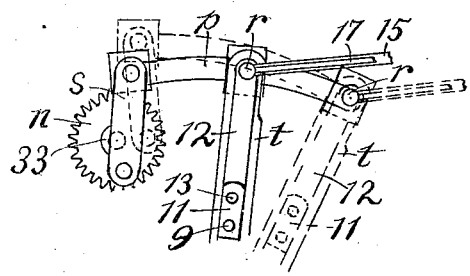
Witnesses:
Rufus Cope
J. Niemeyer.
Inventor
Evelyn P. Sperry
By Harry J. Cromer
Atty.

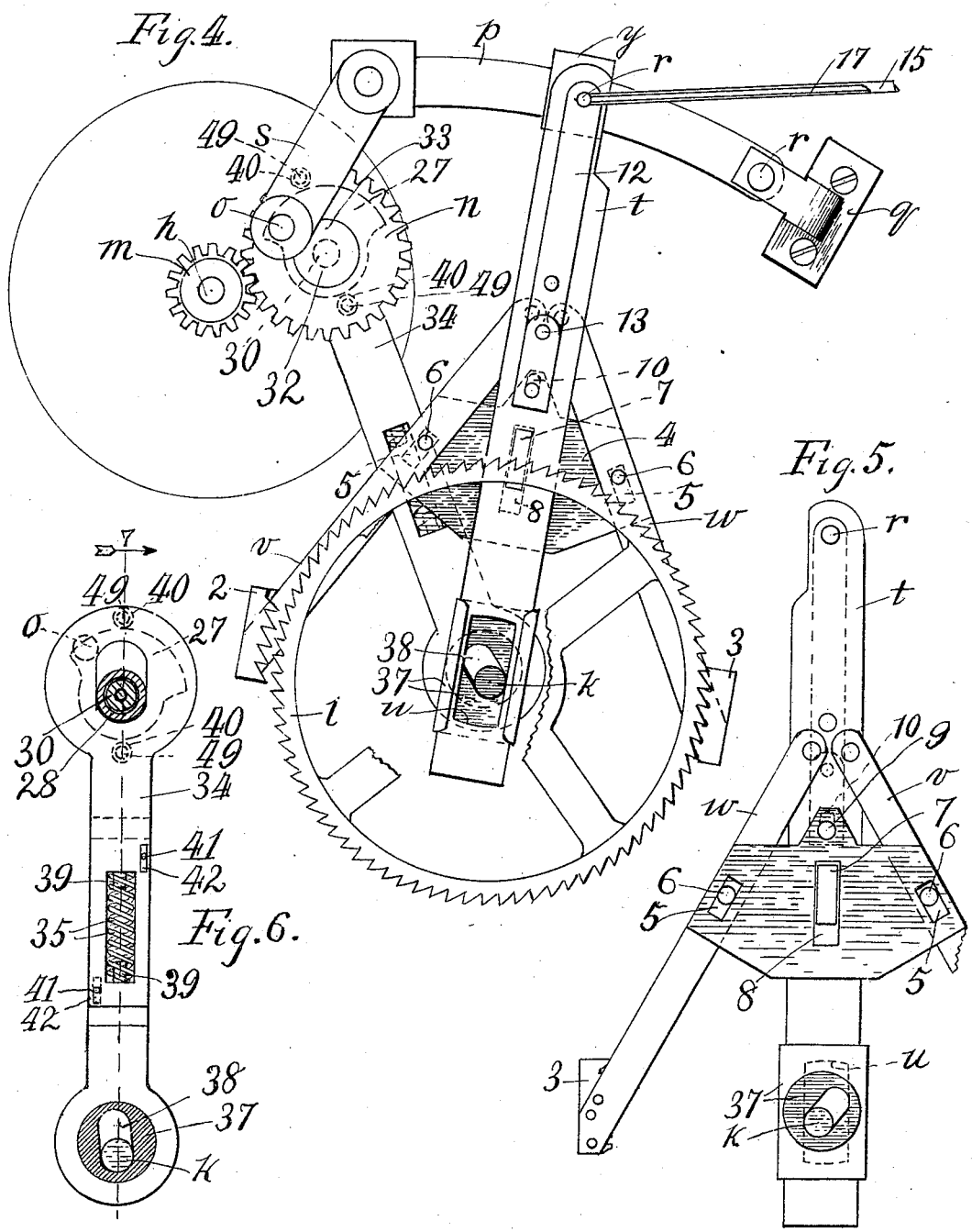

UNITED STATES PATENT OFFICE.

EVELYN P. SPERRY, OF OAK PARK, ILLINOIS.

FEEDING MECHANISM FOR FERTILIZER-SPREADERS.

934,471.

Specification of Letters Patent.  Patented Sept. 21, 1909.

Application filed August 24, 1907. Serial No. 389,974.

*To all whom it may concern:*

Be it known that I, EVELYN P. SPERRY, a citizen of the United States, residing in Oak Park, in the county of Cook and State of Illinois, have invented certain new and useful Improvements in Feeding Mechanisms for Fertilizer-Spreaders, of which the following is a specification.

This invention relates to mechanisms for feeding or operating the movable bottom or apron of a fertilizer spreader for supporting the load of material to be operated upon, and particularly to the feeding mechanism for feeding or operating the apron, regulating the speed at which the apron or movable load support travels and thereby the quantity of material unloaded or distributed, and stopping and starting the movable apron or load supporting element as desired while the vehicle or spreader is in motion.

The principal object of the invention is to provide a simple, economical and efficient fertilizer spreader and feeding and feed-regulating mechanism therefor.

Further objects of the invention are to provide means for feeding or operating the movable load supporting element or endless apron of a fertilizer spreader adapted to enable the quantity of material fed to be regulated and the speed of movement of the feeding apron to be controlled positively and in such a manner that the reciprocating feeding mechanism will at no time during the reciprocating movements of any of its parts in operation permit the movement of the load supporting apron independently of the feeding mechanism; to provide feeding-lever mechanism in the form of a reciprocating pallet having feeding pawls, racks or teeth on opposite sides of a wheel to be fed thereby, with means for moving the pawls, racks or pallet teeth into and out of operative engagement with the wheel to be rotated thereby in such a manner that before the wheel is released by one of the pawls or racks it will be engaged and positively controlled by the other, and to provide means for automatically moving the pawls or pallet teeth into and out of operating engagement with opposite sides of the wheel alternately and during the intervals in which the pallet or feeding lever mechanism is changing the direction of its reciprocating or feeding movements; to provide means for enabling the pallet teeth or pawls to be spread apart so as to be simultaneously out of engagement with the wheel to be operated thereby, thereby enabling the pallet lever to be moved to any desired position with relation to the pivotal point of the operating lever by means of which the pallet is reciprocated to change and control the length of stroke or feeding movement of the pallet and the speed of movement of the apron, or to so position the pallet that it will not be operated by its operating lever although the latter may be in motion thus permitting the movement of the vehicle to continue without operating the pallet or the apron.

Other and further objects of the invention will appear from an examination of the drawings and the following description and claim.

The invention consists in the features, combinations and details of construction hereinafter described and claimed.

In the accompanying drawings Figure 1 is a view in side elevation of a fertilizer spreader provided with apron feeding and controlling mechanism constructed in accordance with my improvements; showing the feeding lever teeth or pawls both out of engagement with the wheel, the pallet operating cam being in position to hold the forward rack in engagement when the racks are moved inward from spread to normal operative position as shown in Fig. 4; Fig. 2, a similar side view showing the pallet lever and rack mechanism in normal operative position and the cam in position to hold the rear pawl in engagement with the wheel; Fig. 3, a side view in detail showing the curved or segmental operating lever which operates the pallet and drives the apron, in lowered position, and showing the pallet lever in full lines in position to be operated by the curved lever, and in dotted lines in position to remain stationary during the movements of the curved operating lever; Fig. 4, an enlarged view in side elevation of the feeding mechanism, with a portion of the toothed wheel broken away and showing the forward feeding pawl or arm of the pallet lever in operative engagement with the wheel, the cam in position to hold the slotted sleeve at the center of the toothed wheel and thereby the pallet or rack mechanism in said position, and the crank pin and curved lever just before reaching their uppermost position or upper shifting point for the pawls or racks; Fig. 5, a back view of the pallet lever mechanism and slotted sleeve and plate; Fig. 6, a front view in elevation of the cam-operated shifting rod; and Fig. 7, a central sectional view in detail of the shifting rod shown in Fig. 6, showing the cam connected with the crank-carrying gear wheel, and, at the opposite end of the rod, the slotted sleeve for connecting it with the pallet.

In constructing a fertilizer spreader provided with apron feeding mechanism embodying my improvements I provide a vehicle having a box $a$ and running gears (not shown), and having a beater indicated by the circular line $b$, a rear axle $c$, a gear-wheel $d$ on said axle, a shaft $e$ having a pinion $f$ in toothed engagement with the gear $d$, a sprocket-wheel $g$ on said shaft, connected with a shaft $h$ of the beater by means of a sprocket chain indicated by a broken line $i$, all of which may be of any ordinary and well known or desired form. The bottom of the box $a$ is formed of an endless apron $j$ which supports the material to be fed to the beater and spread or unloaded by means of the feeding and beater mechanism. The rear portion of the apron travels over and around a shaft $k$ which is operatively connected with the apron by means of toothed wheels (not shown) or in any ordinary known or desired manner, so that the rotation of the shaft in the proper direction will cause the upper lap of the load-supporting, preferably endless apron to travel toward the rear of the vehicle carrying the load with it into position to be operated upon by the beater mechanism, and discharged.

A toothed wheel $l$ is mounted upon and in fixed relation to the shaft $k$ which drives the apron and said shaft is operatively connected with the apron by means of apron supporting wheels $k'$. The wheel $l$ is thus operatively connected with the load supporting or traveling apron which is adapted to be driven or operated thereby, and which apron carries the fertilizer material to be spread, and a pinion $m$ is mounted upon and in fixed relation to the shaft $h$ which is driven by the rear supporting wheels and axle $c$ of the vehicle. A gear wheel $n$ having a wrist pin or crank $o$ thereon is mounted in toothed engagement with the pinion $m$. A curved operating lever $p$ is pivotally mounted upon a bracket $q$ having a pivot pin $r$ upon which the lever is adapted to swing, and a link $s$, mounted upon the crank $o$ is pivotally connected with the swinging end of the lever $p$ so that the rotation of the axle $c$ will cause the said curved operating lever to oscillate. In completing the connections between the axle $c$ and the wheel $l$ and apron, I provide lever mechanism comprising an arm or lever $t$ having an elongated slot $u$ at one end through which the shaft $k$ extends, and lever arms $v$ and $w$ pivotally secured to the member $t$ and having on their extended or lower ends toothed pawls, racks or jaws 2 and 3 respectively on opposite sides of the toothed wheel $l$ into and out of engagement with which said jaws or pallet teeth are movable by means of mechanism hereinafter described. This pallet or operating lever mechanism is connected with the curved operating lever $p$ by means of a sliding block or sleeve $y$ which is slidably mounted on the curved lever and to which the member $t$ is pivotally secured. A plate 4 having inclined diverging side slots 5 into which studs 6 on the side arms $v$ and $w$ respectively extend, is slidably mounted upon the central lever $t$ which has a central stud 7 extending into an elongated central slot 8 in said plate. The plate also has a pin or stud 9 which extends through a vertically elongated slot 10 in the central lever, and an operating link 11 is mounted upon this pin on the side of the central lever opposite that on which the slotted plate is mounted, and is pivotally connected with a lever 12, which is mounted upon the central main lever $t$, by means of a pivot 13. A hand lever 14 is connected with the lever $t$ by means of a rod 15, and a supplementary hand lever 16 is pivotally mounted upon the lever 14 so as to swing therewith and is connected with the lever 12. The lever 14 is pivotally mounted by means of a pivot 18 upon a bracket 19 having a curved locking or securing segmental portion 20 having slots 21 for receiving a catch 22 which is connected with a grip lever 23. A similar catch or tongue 24 mounted upon and operatively connected with a grip lever 25 on the supplementary lever 16 is adapted to be moved into and out of securing engagement with a slotted member or portion 26 of the lever 14. When the levers $t$ and 12 are in normal position, as shown in Figs. 2, 3, and 4, the pivotal points or connections between said levers and the rods 15 and 17 are in alinement, and so are the pivotal centers at the opposite ends of the rods, and the movement of the hand lever 14 to any desired position and the corresponding movement of the main pallet lever $t$ to any desired position longitudinally of the curved lever for the purpose of lengthening or shortening the stroke or feeding movements of the feeding lever mechanism can be accomplished by first moving the levers 12 and 16 to the positions indicated in Fig. 1 for spreading the pawls apart and out of engagement with the wheel $l$, then moving the lever $t$ to the desired position longitudinally of the curved lever to obtain the required length of stroke, and then setting the lever 12 in normal position as indicated in Figs. 2, 3, and 4, so as to hold the pallet teeth or pawls in position to alternately operate the toothed wheel. By thus enabling the pawls to be spread apart the lever mechanism can be set so as to obtain any desired length of stroke and any desired speed of the feeding mechanism and apron relative to the speed of movement of the vehicle and without the setting of the levers being impeded by the weight of the load upon the apron.

In order to provide means for shifting the pawls or pallet teeth automatically into and out of engagement with opposite sides of the wheel $l$ alternately, and in such a manner that the forward pawl will serve to turn the wheel during its upward movement and the rear pawl will turn it during its downward movement, and in order to enable the shifting to take place during the intervals in which the lever mechanism and pawls are changing the direction of their vertical or reciprocating feeding movements—that is to say, at the end of the upward and downward strokes of the lever $p$ and the lever mechanism operated thereby—I provide shifting mechanism constructed as follows: A cam 27 is mounted upon and in fixed relation to a sleeve 28 which sleeve is fixed to or may form an integral part of the gear wheel $n$ already described, and a supporting bracket 29 is provided with a stud 30 which extends through and supports said sleeve and the cam and sprocket wheel. A bolt 31 extends through the stud and is provided with a nut 32 and a washer 33 adapted to hold the parts in position. Reciprocatingly mounted between the gear wheel $n$ and the cam 27 is a shifting rod 34 which is made preferably in two overlapping collapsible or telescoping sections yieldingly connected by means of a compressible spring 35. This rod is provided at one end with an elongated slot 36 through which the sleeve 28 extends, and, at its other end it has a circular opening in which is mounted a sleeve 37 having an oblong slot 38 through which extends the shaft $k$ upon which the wheel $l$ is mounted. The sleeve 37 is in sliding engagement with the lever $t$ so as to permit the free vertical longitudinal movement of said lever therein, and the slot 38 is at an angle with relation to the lever $t$ and at an incline corresponding approximately with the incline of the rod 34, or more particularly with the direction of movement of said rod. The rod 34 is provided at its upper end with a pair of pins 49 having anti-friction rolls or sleeves 40 in engagement with opposite sides of the cam 27 and in line with the direction of longitudinal movement of the shifting rod on which said pins or rolls are mounted. By this arrangement it will be seen that the relatively large portion of the cam serves to operate the rod 34 and shift the lower end of the lever $t$ laterally thereby causing the pawls to alternately come into feeding engagement with the wheel $l$. When the larger peripheral portion of the cam is uppermost, as in Figs. 1 and 4 the forward rack will be held in feeding engagement with the wheel, provided that the pawls are not spread apart as shown in Fig. 1 but are in normal operative position as in Fig. 4. On the other hand, when the larger peripheral portion of the cam is down it will hold the rear pawl or pallet arm in feeding engagement with the wheel. The cam is so arranged with relation to the crank $o$ which operates the curved lever $p$ that the shifting of the pawls into and out of feeding engagement will take place when the lever $p$ and the pawls are at the lower and upper limits of their movements and substantially stationary.

While the crank $o$ and link $s$ are moving from the position shown in Figs. 1 and 4 to the position shown in full lines in Fig. 2, the lever $p$ reaches its highest position and during that interval the larger portion of the cam forces the arm 34 downward at an incline so as to cause the inclined slot 38 in the sleeve 37 to slide downward and forward upon the shaft $k$ thus causing the lower end of the lever $t$ which is slidably mounted in the sleeve 37 to be shifted forward or to the position indicated in Fig. 2, so that the rear pawl is in feeding engagement with the wheel. It follows that when the downward limit of motion of the feeding lever mechanism is reached the opposite pawl will be forced into engagement with the wheel and will be held in such feeding engagement until the position shown in Fig. 4, is reached, so that the feeding device is capable of keeping the wheel almost constantly in rotation and constantly in engagement with one or the other or both pawls, never permitting it to rotate independently of the feeding levers. In other words, in actual operation the racks or pawls are alternately moved into engagement with the ratchet wheel $l$, each being so moved while the other is in engagement with the wheel. They remain in simultaneous engagement with the wheel until one of the racks is withdrawn or in its turn moved out of engagement with the wheel. They are alternately moved out of engagement with the wheel and back into engagement therewith, each being so moved while the other is in engagement with the wheel. One or the other of the racks is therefore in engagement with the wheel at all times when the other is not, and at intervals both racks are in engagement with the wheel at the same time or simultaneously. By referring to Fig. 4 it will be seen that the shifting of both racks the same distance to the right will bring the rack 2 into toothed engagement with the wheel before the rack 3 is out of toothed engagement. In practice this movement is continued for a quarter of an inch while they are thus simultaneously in engagement with the wheel. The wheel-operating mechanism which comprises the racks, is thus adapted to prevent the rotation of the wheel with relation to the rack or pawl which happens to be in engagement with the wheel at any given time and at all times during the operation of the wheel. The wheel is therefore at all times positively engaged and positively controlled and held or prevented from rotating forward or backward independently of the racks or pawls or wheel-operating mechanism, when the device is in actual operation. The racks, when spread as shown in Fig. 1, are out of operative position so as to permit the adjustment of the lever $t$ with relation to the lever $p$ as described.

The object of making the rod 34 expansible and collapsible is that it insures the proper meshing of the teeth of the pawls and wheel and prevents breaking which would otherwise result from the too rigid engagement of the points of the teeth. It is desirable that the spring should be collapsed both by the extension and the collapsing of the sections of the rod or arm 34, as stretching of the spring would cause it to become weakened in its elasticity in one direction. Studs 39, one on each section at each end of the spring and encircled thereby are in sliding engagement with each other, and pins 41 in longitudinally elongated slots 42 in the respective sections serve to guide the sections and permit the free longitudinal movement of both sections in opposite directions against the yielding resistance of the compressible spring and during its compression.

I claim:—

In a machine of the class described, the combination of a wheel rotatably mounted and adapted to be connected with mechanism to be operated, wheel-operating mechanism reciprocatingly mounted, means for reciprocating the wheel-operating mechanism for rotating the wheel, a shaft upon which the wheel to be operated is mounted, a cam, a link operatively connected with the cam, and a sleeve mounted upon the shaft which supports the wheel to be operated and slidably connected with the wheel-operating mechanism and connected with the cam-operated link.

EVELYN P. SPERRY.

Witnesses:
HARRY IRWIN CROMER,
FRANKLIN P. SIMONS.